(12) United States Patent
Zemek et al.

(10) Patent No.: US 12,427,864 B2
(45) Date of Patent: Sep. 30, 2025

(54) INFORMATION PROCESSING DEVICE AND INFORMATION PROCESSING METHOD

(71) Applicant: Nissan Motor Co., Ltd., Kanagawa (JP)

(72) Inventors: Radim Zemek, Kanagawa (JP); Ahmed Musa, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 172 days.

(21) Appl. No.: 18/258,954

(22) PCT Filed: Dec. 25, 2020

(86) PCT No.: PCT/JP2020/048934
§ 371 (c)(1),
(2) Date: Jun. 22, 2023

(87) PCT Pub. No.: WO2022/137558
PCT Pub. Date: Jun. 30, 2022

(65) Prior Publication Data
US 2024/0042855 A1  Feb. 8, 2024

(51) Int. Cl.
*B60K 35/00* (2024.01)
*B60K 35/28* (2024.01)
(Continued)

(52) U.S. Cl.
CPC .............. *B60K 35/00* (2013.01); *B60K 35/28* (2024.01); *B60W 30/0956* (2013.01);
(Continued)

(58) Field of Classification Search
CPC ................... B60K 35/00; B60K 35/28; B60K 2360/1868; B60K 35/29; B60K 2360/188; B60W 30/0956; B60W 40/105; B60W 50/14; B60W 2050/146
USPC ........................................................ 701/36
See application file for complete search history.

(56) References Cited

U.S. PATENT DOCUMENTS 10,002,462 B2 *  6/2018  Seo ..................... G08G 1/09626
11,577,744 B2 *  2/2023  Kimura ................. B60W 50/16
(Continued)

FOREIGN PATENT DOCUMENTS

EP    3299865 A1 *  3/2018  ............. B60K 35/00
EP    3418691 A1 * 12/2018  ............. B60K 35/00
(Continued)

*Primary Examiner* — Tuan C To
(74) *Attorney, Agent, or Firm* — Osha Bergman Watanabe & Burton LLP

(57) ABSTRACT

An information processing device and an information processing method control a display unit including a display area that is transparent to surrounding of a vehicle such that the surrounding is visible from a driver's seat of the vehicle, determine whether an object is within a range of a predetermined distance from the vehicle or a route on which the vehicle is scheduled to travel, based on information of the object located in the surrounding of the vehicle, increase a ratio of the display area that allows the surrounding to pass through by changing part or all of an image displayed and superimposed on the display area in a case of determining that the object is within the range.

13 Claims, 3 Drawing Sheets

(51) Int. Cl.
*B60W 30/095* (2012.01)
*B60W 30/14* (2006.01)
*B60W 40/105* (2012.01)
*B60W 50/14* (2020.01)
*B60K 35/29* (2024.01)

(52) U.S. Cl.
CPC .......... *B60W 40/105* (2013.01); *B60W 50/14* (2013.01); *B60K 35/29* (2024.01); *B60K 2360/1868* (2024.01); *B60K 2360/188* (2024.01); *B60W 2050/146* (2013.01)

(56) References Cited

U.S. PATENT DOCUMENTS

| | | | | |
|---|---|---|---|---|
| 2011/0301956 A1* | 12/2011 | Sano | ......................... | G06F 3/16 |
| | | | | 704/E15.001 |
| 2016/0159280 A1 | 6/2016 | Takazawa et al. | | |
| 2017/0060234 A1* | 3/2017 | Sung | ......................... | B60R 1/27 |
| 2017/0187963 A1 | 6/2017 | Lee et al. | | |
| 2017/0240109 A1* | 8/2017 | Kimura | ................... | G08G 1/167 |
| 2018/0157036 A1 | 6/2018 | Choi et al. | | |
| 2020/0189614 A1* | 6/2020 | Ito | ..................... | B60W 30/0956 |
| 2023/0069348 A1* | 3/2023 | Park | ........................ | G06F 3/147 |

FOREIGN PATENT DOCUMENTS

| | | | | | |
|---|---|---|---|---|---|
| EP | 4046883 A1 | * | 8/2022 | ............ | B60W 30/06 |
| JP | 2006-284458 A | | 10/2006 | | |
| JP | 2012-153256 A | | 8/2012 | | |
| JP | 2013-108852 A | | 6/2013 | | |
| JP | 2017-151637 A | | 8/2017 | | |
| JP | 2019-12236 A | | 1/2019 | | |
| JP | 2019-059248 A | | 4/2019 | | |
| WO | 2018/070193 A1 | | 4/2018 | | |
| WO | 2018101552 A2 | | 6/2018 | | |
| WO | 2019003929 A1 | | 1/2019 | | |

* cited by examiner

INFORMATION PROCESSING DEVICE AND INFORMATION PROCESSING METHOD

TECHNICAL FIELD

The present invention relates to an information processing device and an information processing method.

BACKGROUND ART

Patent Literature 1 discloses a head-up display device that makes it easier for the user to recognize important information while driving by displaying an AR (Augmented Reality) guide in a display area visible through a windshield from a driver's seat of a vehicle such that the AR guide is superimposed and displayed in the real world.

CITATION LIST

Patent Literature

Patent Literature 1: International Publication No. 2018/070193

SUMMARY OF INVENTION

Technical Problem

According to the invention described in Patent Literature 1, as a result of the AR guide being superimposed and displayed in the real world, there is a possibility that the user's attention to the real world may be lowered by the AR guide. As a result, there is a problem that the user of the vehicle may be delayed in noticing the change in the driving environment in the real world.

The present invention has been made in view of the above problems, and an object of the present invention is to provide an information processing device and an information processing method that can suppress a user's attention to the real world from being lowered by the AR guide, and that can make the user of the vehicle easily notice the change in the driving environment in the real world.

Solution to Problem

An information processing device and an information processing method, according to an aspect of the present invention, control a display unit including a display area that is transparent to surrounding of a vehicle such that the surrounding is visible from a driver's seat of the vehicle, determine whether an object is within a range of a predetermined distance from the vehicle or a route on which the vehicle is scheduled to travel, based on information of the object located in the surrounding of the vehicle, increase a ratio of the display area that allows the surrounding to pass through by changing part or all of an image displayed and superimposed on the display area in a case of determining that the object is within the range.

Advantageous Effects of Invention

According to the present invention, the user's attention to the real world can be suppressed from being lowered by the AR guide, and the user of the vehicle can easily notice the change in the driving environment in the real world.

DESCRIPTION OF EMBODIMENTS

Figure 1:
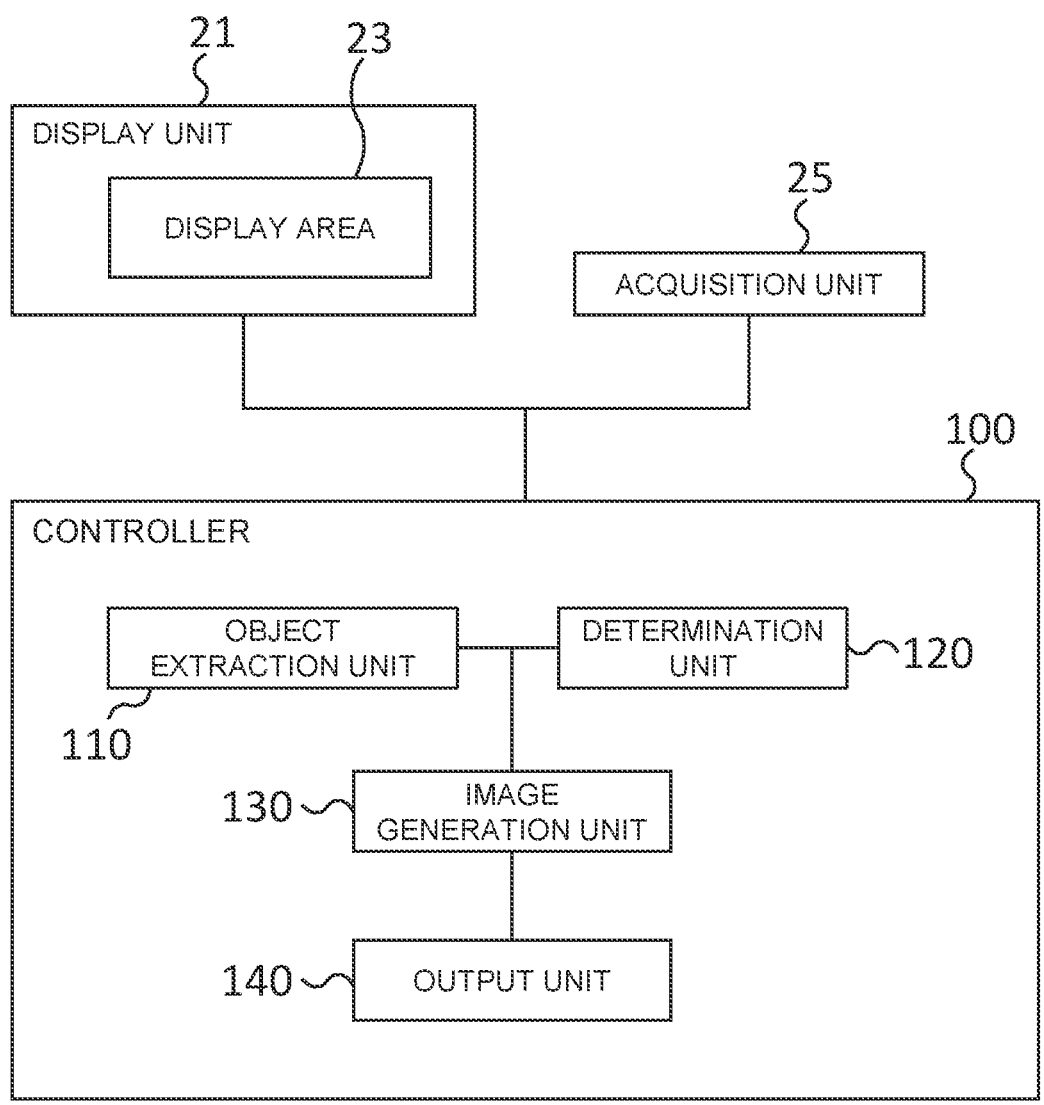
FIG. 1 is a block diagram illustrating a configuration of an information processing device according to an embodiment of the present invention.

Hereinafter, embodiments of the present invention will be described with reference to the drawings. In the description of the drawings, the same items are designated by the same reference numerals and duplicate description will be omitted.

[Configuration of Information Processing Device]

A configuration example of the information processing device according to the present embodiment will be described with reference to FIG. 1. The information processing device is mounted on a vehicle as an example. As shown in FIG. 1, the information processing device includes an acquisition unit 25, a display unit 21, and a controller 100.

The acquisition unit 25 is connected to the controller 100 and acquires information of an object located in surrounding of the vehicle (object information) and information of a route on which the vehicle is scheduled to travel (route information).

More specifically, the acquisition unit 25 is connected to a plurality of object detection sensors mounted on the vehicle, such as a laser radar, a millimeter wave radar, and a camera, which detect objects around the vehicle. The object detection sensor detects moving objects including other vehicles, motorcycles, bicycles, pedestrians, and stationary objects including parked vehicles, as objects around the vehicle. For example, the object detection sensor detects the position, attitude (yaw angle), size, speed, acceleration, deceleration, and yaw rate of moving and stationary objects with respect to the vehicle. The acquisition unit 25 acquires information about the moving object and the stationary object detected by the object detection sensor as the object information.

Further, the acquisition unit 25 is connected to a navigation device (not shown), and acquires, for example, information of a guidance route to the destination of the vehicle as the route information. In addition, the acquisition unit 25 may acquire information such as a road map, the current position of the vehicle, and a point of interest (POI), which is a place of interest of the user scattered between the vehicle and the destination.

In addition, the acquisition unit 25 may acquire a captured image obtained by imaging the surrounding of the vehicle.

The acquisition unit 25 may have a storage unit that stores acquired object information and acquired route information.

The display unit 21 is connected to the controller 100 and has a display area 23 that is transparent to the surrounding of the vehicle such that the surrounding is visible from a driver's seat of the vehicle. The AR guide (image) generated by the controller 100 is displayed in the display area 23. Therefore, in the display area 23, the AR guide is displayed superimposed on the scenery around the vehicle.

For example, the display unit 21 may be a head-up display device, a head-mounted display, smart glasses, or a prompter.

The display area 23 may be a windshield of the vehicle, and the AR guide may be projected onto the display area 23 from a projector (not shown) to present the AR guide to the user. As a result, the user will see the AR guide superimposed on the scenery around the vehicle that can be seen through the windshield.

The AR guide presented by the display unit 21 expresses, for example, a guide route to the destination of the vehicle, a road map, the current position of the vehicle, and a point of interest (POI) of the user scattered between the vehicle and the destination, and the like.

The display unit 21 may display the AR guide by superimposing it on the captured image acquired by the acquisition unit 25. In this case, the display area 23 may be a display capable of displaying the captured image and the AR guide instead of being transparent to the surrounding such that the surrounding is visible from the driver's seat of the vehicle.

The controller 100 is a general-purpose computer including a CPU (Central Processing Unit), a memory, a storage device, an input/output unit, and the like. The controller 100 is connected to a navigation device (not shown). For example, the navigation device performs route guidance of the vehicle.

The controller 100 (control unit) is a general-purpose microcomputer including a CPU (central processing unit), a memory, and an input/output unit. A computer program for functioning as the information processing device is installed in the controller 100. By executing the computer program, the controller 100 functions as a plurality of information processing circuits (110, 120, 130, 140) included in the information processing device. The computer program may be stored in a recording medium that can be read and written by a computer.

In the present embodiment, an example is shown in which the plurality of information processing circuits (110, 120, 130, 140) are realized by software. However, it is also possible to configure information processing circuits (110, 120, 130, 140) by preparing dedicated hardware for executing each of the following information processing. Further, the plurality of information processing circuits (110, 120, 130, 140) may be configured by individual hardware. Further, the information processing circuit (110, 120, 130, 140) may also be used as a navigation device or a control unit used for controlling a vehicle.

As shown in FIG. 1, the controller 100 includes an object extraction unit 110, a determination unit 120, an image generation unit 130, and an output unit 140 as the plurality of information processing circuits (110, 120, 130, 140).

The object extraction unit 110 extracts an object that may interfere with the traveling of the vehicle based on the object information and the route information. For example, the object extraction unit 110 extracts an object existing within a predetermined distance from the vehicle or within a predetermined distance from the route on which the vehicle is scheduled to travel. Here, the predetermined distance is set in advance.

Note that different predetermined distances may be set according to the type of the object. For example, the predetermined distance set for the object having a high moving speed may be set longer than the predetermined distance set for the object having a low moving speed. The predetermined distance set when extracting other vehicles, motorcycles, and bicycles may be set longer than the predetermined distance set when extracting pedestrians and parked vehicles.

In addition, the object extraction unit 110 may extract an object that exists within the predetermined distance from the vehicle or within the predetermined distance from the route on which the vehicle is scheduled to travel and is located forward with respect to the direction in which the vehicle travels.

The object extraction unit 110 may extract an object located in a range visible from the driver's seat of the vehicle via the display area 23.

The determination unit 120 determines whether the object interferes with a travelling of the vehicle based on the object information and the route information for the object extracted by the object extraction unit 110.

For example, the determination unit 120 may determine whether the object approaches the vehicle or the route on which the vehicle is scheduled to travel, and in a case of determining that the object approaches the vehicle or the route, the determination unit 120 may determine that the object interferes with the travelling of the vehicle.

The determination unit 120 may predict the distance between the object and the vehicle after a unit time has elapsed, based on the object information and the route information. Then, the determination unit 120 may determine that the object approaches the vehicle when the distance between the object and the vehicle after a unit time elapses is smaller than the distance between the current object and the vehicle.

The determination unit 120 may predict the distance between the object and the route on which the vehicle is scheduled to travel after a unit time has elapsed, based on the object information and the route information. Then, in a case that the distance between the object and the route after a unit time elapses is smaller than the distance between the current object and the route, the determination unit 120 may determine that the object approaches the route on which the vehicle plans to travel.

Further, the determination unit 120 may determine whether the object is shielded by the AR guide displayed in the display area 23 when viewed from the driver's seat, and in a case of determining that the object is shielded by the AR guide, the determination unit 120 may determine that the object interferes with the travelling of the vehicle.

Further, the determination unit 120 may determine whether the distance visually recognized in the display area 23 between an appearance of the object and the AR guide when viewed from the driver's seat (distance on the display area 23) is equal to or less than a predetermined distance. Then, the determination unit 120 may determine that the object interferes with the travelling of the vehicle in a case that the distance between the appearance of the object and the AR guide is equal to or less than the predetermined distance.

The predetermined distance may be set based on the size of the appearance of the object in the display area 23 and the size of the AR guide. For example, the predetermined distance set when the size of the appearance of the object is small may be set larger than the predetermined distance set when the size of the appearance of the object is large. Further, the predetermined distance set when the ratio of the size of the appearance of the object to the size of the AR guide is small may be set larger than the predetermined distance set when the ratio of the size of the appearance of the object to the size of the AR guide is large.

Further, the determination unit 120 may calculate a collision time between the object and the vehicle based on the object information and the route information, and may determine whether the collision time is equal to or less than a predetermined time. Then, the determination unit 120 may determine that the object interferes with the travelling of the vehicle in a case of determining that the collision time is equal to or less than the predetermined time. Here, the collision time between the object and the vehicle is calculated based on the moving speed and the moving direction of the object, and the moving speed and the moving direction of the vehicle.

Further, the determination unit 120 may determine whether a speed of the vehicle is equal to or higher than the predetermined speed and may determine that the object interferes with the travelling of the vehicle in a case of determining that the speed of the vehicle is equal to or higher than the predetermined speed.

Further, the determination unit 120 determines whether a speed of the object is equal to or higher than the predetermined speed based on the object information and may determine that the object interferes with the travelling of the vehicle in a case of determining that the speed of the object is equal to or higher than the predetermined speed.

The image generation unit 130 generates the AR guide based on the route information. For example, the image generation unit 130 generates the AR guide that is visually recognized in the display area 23 when viewed from the driver's seat and overlaps with the image of the route on which the vehicle is scheduled to travel.

Figure 3A:
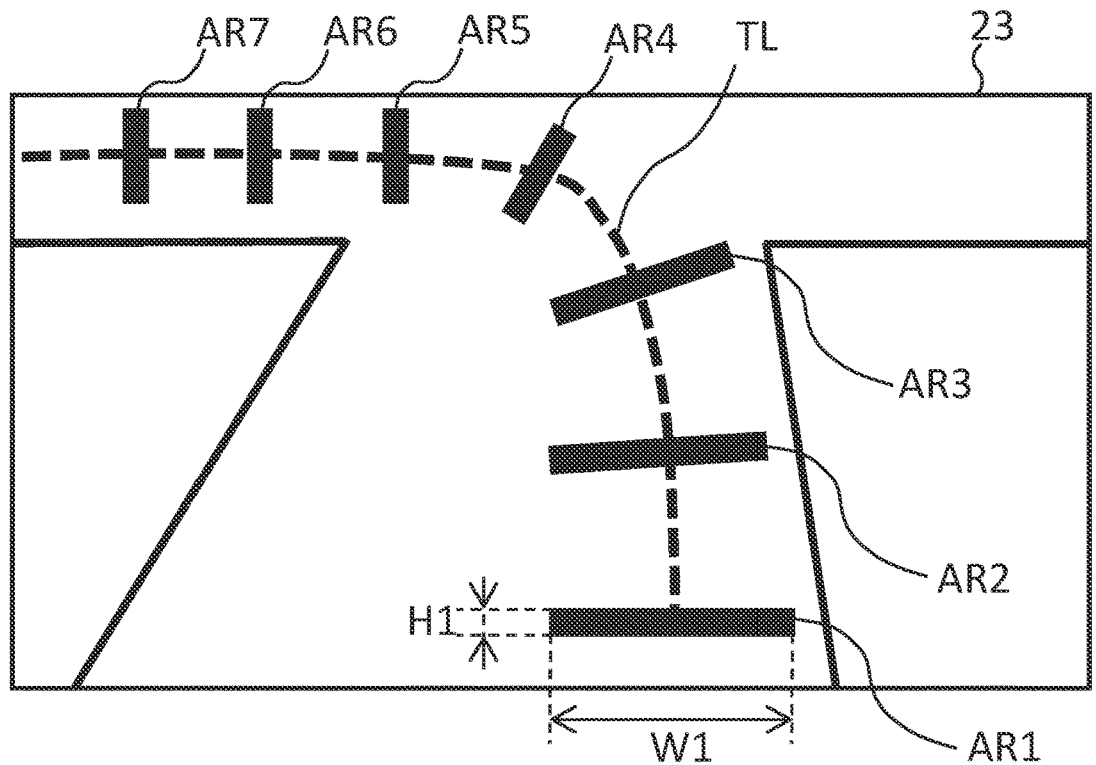
FIG. 3A is a diagram illustrating a first example of the display of the AR guide.
Figure 3B:
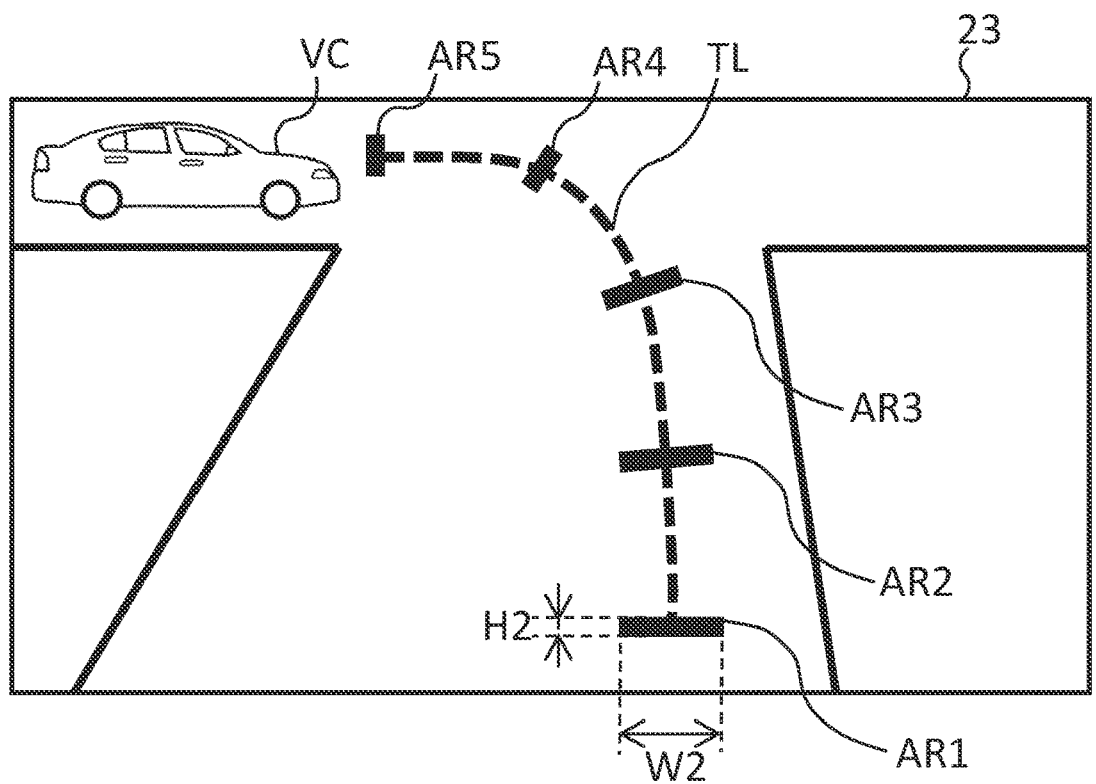
FIG. 3B is a diagram illustrating a second example of the display of the AR guide.

FIGS. 3A and 3B illustrate examples of AR guides generated so as to overlap the image of the route on which the vehicle is scheduled to travel. FIG. 3A is a diagram illustrating a first example of the display of the AR guide. FIG. 3B is a diagram illustrating a second example of the display of the AR guide. In FIGS. 3A and 3B, it is assumed that a left turn is planned at an intersection located in front of a lane in which the vehicle travels.

FIG. 3A shows how the AR guides AR1 to AR7 are displayed in the display area 23 along the image TL of the route on which the vehicle is scheduled to travel. Therefore, the user can recognize the route on which the vehicle plans to travel along the AR guides AR1 to AR7.

FIG. 3B shows how the AR guides AR1 to AR5 are displayed in the display area 23 along the image TL of the route on which the vehicle is scheduled to travel. Unlike FIG. 3A, the AR guide AR6 and AR guide AR7 are not shown because of the presence of another vehicle VC.

When another vehicle VC become to be able to visually recognize via the display area 23, the image generation unit 130 changes the AR guide from the state of FIG. 3A to the state of FIG. 3B.

That is, in a case that the object extracted by the object extraction unit 110 exists, the image generation unit 130 change part or all of the AR guide to increase a ratio of the display area 23 that allows the surrounding of the vehicle to pass through. Further, in a case that there is the object that interferes with the traveling of the vehicle determined by the determination unit 120, the image generation unit 130 change part or all of the AR guide to increase the ratio of the display area 23 that allows the surrounding of the vehicle to pass through.

Further, the image generation unit 130 may increase transmittance of part or all of the AR guide to increase the ratio of the display area 23 that allows the surrounding of the vehicle to pass through. Further, the image generation unit 130 may set the transmittance of part or all of the AR guide as 100% to increase the ratio of the display area 23 that allows the surrounding of the vehicle to pass through. According to FIGS. 3A and 3B, another vehicle VC shown in FIG. 3B may be made visible by increasing the transmittance of the AR guide AR6 and the AR guide AR7.

Further, the image generation unit 130 may increase the ratio of the display area 23 that allows the surrounding of the vehicle to pass through by reducing a size of part or all of the AR guide. According to FIGS. 3A and 3B, in the state after the size change (FIG. 3B) as compared with the state before the size change (FIG. 3A), the size of a part or all of the AR guides AR1 to AR7 (for example, height or width) is reduced. As a result, another vehicle VC shown in FIG. 3B can be easily visually recognized.

Further, the image generation unit 130 may increase the ratio of the display area 23 that allows the surrounding of the vehicle to pass through by reducing a width of the AR guide showing the route on which the vehicle is scheduled to travel, the width is along a width direction of a road on which the vehicle travels. According to FIGS. 3A and 3B, as compared with the width W1 of the AR guide along the road width direction in the state before the size is changed (FIG. 3A), the width W2 of the AR guide along the road width direction in the state after the size is changed (FIG. 3B) becomes small. As a result, another vehicle VC shown in FIG. 3B can be easily visually recognized.

Further, the image generation unit 130 may increase the ratio of the display area 23 that allows the surrounding of the vehicle to pass through by reducing a length of the AR guide showing the route on which the vehicle is scheduled to travel, the length is along a direction in which the vehicle travels.

According to FIGS. 3A and 3B, as compared with the height H1 of the AR guide along the direction in which the vehicle travels in the state before the size change (FIG. 3A), the height H2 of the AR guide along the direction in which the vehicle travels in the state after the size change (FIG. 3B) becomes small. As a result, another vehicle VC shown in FIG. 3B can be easily visually recognized.

Further, as compared with the total length of the AR guide (the length from the AR guide AR1 to the AR guide AR7) along the direction in which the vehicle travels in the state of FIG. 3A, the total length of the AR guide (the length from the AR guide AR1 to the AR guide AR5) along the direction in which the vehicle travels in the state of FIG. 3B is reduced. As a result, another vehicle VC shown in FIG. 3B can be easily visually recognized.

Further, the image generation unit 130 may increase the ratio of the display area 23 that allows the surrounding of the vehicle to pass through by approximating a color of part or all of the AR guide to a color of the surrounding of the vehicle. For example, the image generation unit 130 may acquire the color of the surrounding of the vehicle based on the captured image.

According to FIGS. 3A and 3B, by bringing the colors of the AR guides AR1 to AR7 closer to the colors around the vehicle as the background in the display area 23, another vehicle VC shown in FIG. 3B can be visually recognized. Further, the colors of the AR guide AR6 and the AR guide AR7 in FIG. 3A may be approximated to the color of another vehicle VC in FIG. 3B.

By bringing the color of a part or all of the AR guide closer to the color around the vehicle, the AR guide becomes inconspicuous in the display area 23, and the object visible through the display area 23 becomes relatively conspicuous. As a result, according to FIG. 3B, another vehicle VC can be easily visually recognized.

In addition, for example, in an RGB color model (a model that expresses colors with the three primary colors of red, green, and blue), "approximating color" means making an RGB values of the AR guide closer to an RGB values of the image of the surrounding of the vehicle reflected in the display area 23.

In addition, in a case that the object extracted by the object extraction unit 110 does not exist, the image generation unit 130 may decrease the ratio of the display area 23 that allows the surrounding of the vehicle to pass through by changing a part or all of the AR guide. Further, in a case that there is no object that interferes with the traveling of the vehicle by the determination unit 120, the image generation unit 130 may decrease the ratio of the display area 23 that allows the surrounding of the vehicle to pass through by changing a part or all of the AR guide.

According to FIGS. 3A and 3B, in a case that another vehicle VC runs away and becomes invisible through the display area 23, the image generation unit 130 may decrease the ratio of the display area 23 that allows the surrounding of the vehicle to pass through by changing the AR guide from the state of FIG. 3B to the state of FIG. 3A. This makes the AR guide easily visible.

The output unit 140 outputs the AR guide generated/changed by the image generation unit 130. The output AR guide is displayed in the display area 23.

[Processing Procedure of the Information Processing Device]

Figure 2:
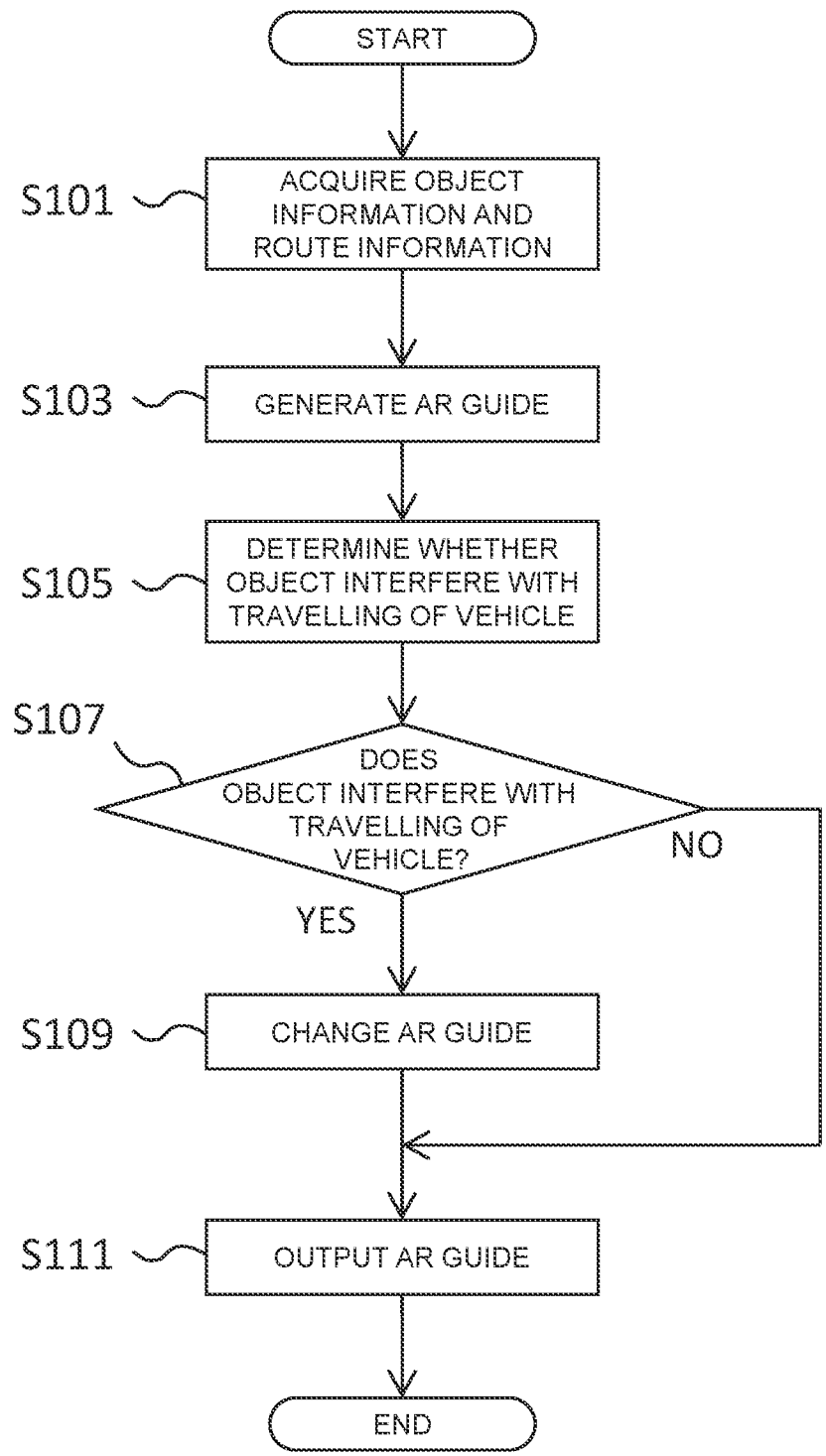
FIG. 2 is a flowchart illustrating a processing of the information processing device according to the embodiment of the present invention.

Next, the processing procedure of the information processing device according to the present embodiment will be described with reference to the flowchart of FIG. 2. The processing of the information processing device shown in FIG. 2 may be started based on a user's instruction or may be repeatedly executed at a predetermined cycle.

First, in step S101, the acquisition unit 25 acquires the object information and the route information. The acquired object information and the acquired route information are transmitted to the controller 100.

In step S103, the image generation unit 130 generates an AR guide based on the route information.

In step S105, the object extraction unit 110 extracts an object that may interfere with the traveling of the vehicle based on the object information and the route information. Then, the determination unit 120 determines whether the object interferes with the travelling of the vehicle based on the object information and the route information for the object extracted by the object extraction unit 110.

If it is determined that the object interferes with the travelling of the vehicle (YES in step S107), the image generation unit 130 changes the AR guide in step S109. More specifically, the image generation unit 130 modifies a part or all of the AR guide to increase the ratio of the display area 23 that allows the surrounding of the vehicle to pass through. Then, the process proceeds to step S111.

On the other hand, if it is determined that the object does not interfere with the traveling of the vehicle (NO in step S107), the process proceeds to step S111.

In step S111, the output unit 140 outputs the AR guide generated/changed by the image generation unit 130. The output AR guide is displayed in the display area 23.

Effects of Embodiments

As explained in detail above, an information processing device and an information processing method according to the present embodiment control a display unit including a display area that is transparent to surrounding of a vehicle such that the surrounding is visible from a driver's seat of the vehicle, determine whether an object is within a range of a predetermined distance from the vehicle or a route on which the vehicle is scheduled to travel, based on information of the object located in the surrounding of the vehicle, increase a ratio of the display area that allows the surrounding to pass through by changing part or all of an image (AR guide) displayed and superimposed on the display area in a case of determining that the object is within the range.

As a result, the user's attention to the real world can be suppressed from being lowered by the AR guide, and the user of the vehicle can easily notice the change in the driving environment in the real world. In addition, the possibility that the object located around the vehicle is shielded by the AR guide is reduced, and the user can easily notice the object, or the behavior change of the object. As a result, the user can perform a faster driving operation corresponding to the change in the behavior of the object.

Therefore, the user can obtain the driving support from the system by the display of the AR guide, and at the same time, can operate the vehicle without lowering the attention to the objects located around the vehicle.

Further, the information processing device and the information processing method according to the present embodiment may increase transmittance of part or all of the image to increase the ratio of the display area that allows the surrounding to pass through. As a result, the possibility that the object located around the vehicle is shielded by the AR guide is reduced, and the user can easily notice the object, or the behavior change of the object. By controlling the transmittance of the image, the user can pay attention to the objects located around the vehicle while checking the displayed AR guide.

Further, the information processing device and the information processing method according to the present embodiment may set the transmittance as 100% to increase the ratio of the display area that allows the surrounding to pass through. As a result, the object located around the vehicle is suppressed from being shielded by the AR guide, and the user can easily notice the object, or the behavior change of the object. The user can also pay attention to objects located around the vehicle.

Further, the information processing device and the information processing method according to the present embodiment may reduce a size of part or all of the image to increase the ratio of the display area that allows the surrounding to pass through. As a result, the object located around the vehicle is suppressed from being shielded by the AR guide.

Further, the information processing device and the information processing method according to the present embodiment may reduce a width of the image showing the route to increase the ratio of the display area that allows the surrounding to pass through, wherein the width is along a width direction of a road on which the vehicle travels. This makes it easier for the user to notice an object located on the side of the road on which the vehicle travels and a change in the behavior of the object. In particular, the user is more likely to notice an object popping out from the side of the road on which the vehicle travels. As a result, the user can perform a faster driving operation corresponding to an object popping out from the side of the road.

Further, the information processing device and the information processing method according to the present embodiment may reduce a length of the image showing the route to increase the ratio of the display area that allows the surrounding to pass through, wherein the length is along a direction in which the vehicle travels. This makes it easier for the user to notice an object located in front of the vehicle along the direction in which the vehicle travels and a change in the behavior of the object. As a result, the user can perform a faster driving operation corresponding to the object located in front of the vehicle.

Further, the information processing device and the information processing method according to the present embodiment may approximate a color of part or all of the image to a color of the surrounding to increase the ratio of the display area that allows the surrounding to pass through. This prevents the user's attention to objects located around the vehicle from being reduced by the AR guide. Furthermore, the user can easily notice the change in the behavior of the object. As a result, the user can perform a faster driving operation corresponding to the change in the behavior of the object.

Further, the information processing device and the information processing method according to the present embodiment may determine whether the object interferes with a travelling of the vehicle based on the information and may increase the ratio in a case of determining that the object interferes with the travelling of the vehicle. This makes it possible to extract an object which driving operation of the vehicle needs to be changed in order to avoid the running of the vehicle from being interfered with. Therefore, the user can easily notice the object, and the user can perform a faster driving operation corresponding to the behavior of the object for which driving operation of the vehicle needs to be changed.

Further, the information processing device and the information processing method according to the present embodiment may determine whether the object approaches the vehicle or the route and may determine that the object interferes with the travelling of the vehicle in a case of determining that the object approaches the vehicle or the route. As a result, it is possible to accurately extract an object which driving operation of the vehicle needs to be changed in order to avoid the running of the vehicle from being interfered with.

Further, the information processing device and the information processing method according to the present embodiment may determine whether the object is shielded by the image displayed in the display area and may determine that the object interferes with the travelling of the vehicle in a case of determining that the object is shielded by the image. As a result, it is possible to accurately extract an object which driving operation of the vehicle needs to be changed in order to avoid the running of the vehicle from being interfered with. Further, since it is possible to determine whether the object is shielded by the image based on the information on the position of the object without using the information on the velocity of the object, the calculation cost for extracting the object can be reduced.

Further, the information processing device and the information processing method according to the present embodiment may calculate a collision time between the object and the vehicle, may determine whether the collision time is equal to or less than a predetermined time, and may determine that the object interferes with the travelling of the vehicle in a case of determining that the collision time is equal to or less than the predetermined time. As a result, it is possible to accurately extract an object which driving operation of the vehicle needs to be changed in order to avoid the running of the vehicle from being interfered with.

Further, the information processing device and the information processing method according to the present embodiment may determine whether a speed of the vehicle is equal to or higher than a predetermined speed and may determine that the object interferes with the travelling of the vehicle in a case of determining that the speed of the vehicle is equal to or higher than the predetermined speed. As a result, it is possible to accurately extract an object which driving operation of the vehicle needs to be changed in order to avoid the running of the vehicle from being interfered with. Further, since it is possible to determine whether the object is shielded by the image based on the information on the speed of the object without using the information on the position of the object, the calculation cost for extracting the object can be reduced.

Further, the information processing device and the information processing method according to the present embodiment may decrease the ratio in a case of determining that the object does not interfere with the travelling of the vehicle. As a result, the smaller the number of objects that interfere with the running of the vehicle, the smaller the ratio of the display area that allows the surrounding to pass through. As a result, it is possible to maximize the effect of the driving support that the user receives from the system by displaying the AR guide.

Respective functions described in the above embodiment may be implemented by one or plural processing circuits. The processing circuits include programmed processors, electrical circuits, etc., as well as devices such as application specific integrated circuits (ASIC) and circuit components arranged to perform the described functions, etc.

Although the contents of the present invention have been described above with reference to the embodiment, the present invention is not limited to these descriptions, and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

It is needless to mention that the present invention also includes various embodiments that are not described herein. Therefore, the technical scope of the present invention is to be defined only by the invention specifying matters according to the scope of claims appropriately obtained from the above descriptions.

REFERENCE SIGNS LIST 21 display unit
23 display area
25 acquisition unit
100 controller
110 object extraction unit
120 determination unit
130 image generation unit
140 output unit

The invention claimed is:
1. An information processing device including a display unit, a storage unit, and a controller, wherein:
the storage unit is configured to store information of:
an object located in surrounding of a vehicle, and
a route on which the vehicle is scheduled to travel,
the display unit includes a display area that is transparent to the surrounding such that the surrounding is visible from a driver's seat of the vehicle, and is configured to display an image superimposed on the display area, when the controller generates the image based on the route, the controller is configured to:
  determine whether the object approaches the route, based on the information,
  determine that the object interferes with the travelling of the vehicle in a case of determining that the object approaches the route, and
  increase a ratio of the display area that allows the surrounding to pass through by changing part or all of the image in a case of determining that the object interferes with the travelling of the vehicle.

2. The information processing device according to claim 1, wherein the controller is configured to increase transmittance of part or all of the image.

3. The information processing device according to claim 2, wherein the controller is configured to set the transmittance as 100%.

4. The information processing device according to claim 1, wherein the controller is configured to reduce a size of part or all of the image.

5. The information processing device according to claim 4, wherein the controller is configured to reduce a width of the image showing the route, the width is along a width direction of a road on which the vehicle travels.

6. The information processing device according to claim 4, wherein the controller is configured to reduce a length of the image showing the route, the length is along a direction in which the vehicle travels.

7. The information processing device according to claim 1, wherein the controller is configured to approximate a color of part or all of the image to a color of the surrounding.

8. The information processing device according to claim 1, wherein the controller is configured to:
  determine whether the object is shielded by the image displayed in the display area, and
  determine that the object interferes with the travelling of the vehicle in a case of determining that the object is shielded by the image.

9. The information processing device according to claim 1, wherein the controller is configured to decrease the ratio in a case of determining that the object does not interfere with the travelling of the vehicle.

10. An information processing method for controlling a display unit including a display area that is transparent to surrounding of a vehicle such that the surrounding is visible from a driver's seat of the vehicle, comprising:
  acquiring information of an object located in the surrounding of a vehicle, and a route on which the vehicle is scheduled to travel, when generating an image displayed and superimposed on the display area based on the route,
  determining whether the object approaches the route, based on the information,
  determine that the object interferes with the travelling of the vehicle in a case of determining that the object approaches the vehicle or the route, and
  increasing a ratio of the display area that allows the surrounding to pass through by changing part or all of the image in a case of determining that the object interferes with the travelling of the vehicle.

11. An information processing device including a display unit, a storage unit, and a controller, wherein:
  the storage unit is configured to store information of:
    an object located in surrounding of a vehicle, and
    a route on which the vehicle is scheduled to travel,
  the display unit includes a display area that is transparent to the surrounding such that the surrounding is visible from a driver's seat of the vehicle, and is configured to display an image superimposed on the display area,
  when the controller generates the image based on the route, the controller is configured to, based on the information:
    calculate a collision time between the object and the vehicle,
    determine whether the collision time is equal to or less than a predetermined time,
    determine whether a screen distance on the display area between an appearance of the object viewed from the driver's seat and the image is equal to or less than a predetermined screen distance,
    determine whether a speed of the vehicle is equal to or higher than a predetermined speed,
    determine that the object interferes with the travelling of the vehicle in a case of:
      determining that the collision time is equal to or less than the predetermined time,
      determining that the screen distance is equal to or less than the predetermined screen distance, or
      determining that the speed of the vehicle is equal to or higher than the predetermined speed, and
    increase a ratio of the display area that allows the surrounding to pass through by changing part or all of the image in a case of determining that the object interferes with the travelling of the vehicle.

12. The information processing device according to claim 11, wherein the predetermined screen distance is set based on a size of the appearance of the object on the display area or a size of the image on the display area.

13. An information processing method for controlling a display unit including a display area that is transparent to surrounding of a vehicle such that the surrounding is visible from a driver's seat of the vehicle, comprising:
  acquiring information of an object located in the surrounding of a vehicle, and a route on which the vehicle is scheduled to travel, when generating an image displayed and superimposed on the display area based on the route,
  calculating a collision time between the object and the vehicle based on the information,
  determining whether the collision time is equal to or less than a predetermined time based on the information,
  determining whether a screen distance on the display area between an appearance of the object viewed from the driver's seat and the image is equal to or less than a predetermined screen distance based on the information,
  determining whether a speed of the vehicle is equal to or higher than a predetermined speed based on the information,
  determining that the object interferes with the travelling of the vehicle in a case of:
    determining that the collision time is equal to or less than the predetermined time,
    determining that the screen distance is equal to or less than the predetermined screen distance, or
    determining that the speed of the vehicle is equal to or higher than the predetermined speed,
  increasing a ratio of the display area that allows the surrounding to pass through by changing part or all of the image in a case of determining that the object interferes with the travelling of the vehicle.

* * * * *